United States Patent [19]

Bischof

[11] Patent Number: 5,529,428
[45] Date of Patent: Jun. 25, 1996

[54] METALLIC STRUCTURAL ELEMENT FOR CONNECTING WORKPIECES CONSISTING OF WOOD, WOODWORKING MATERIAL OR PLASTIC

[76] Inventor: Albrecht Bischof, Holgasse 34, CH-8634 Hombrechtikon, Switzerland

[21] Appl. No.: 244,373

[22] PCT Filed: Oct. 1, 1993

[86] PCT No.: PCT/CH93/00235

§ 371 Date: Jun. 8, 1994

§ 102(e) Date: Jun. 8, 1994

[87] PCT Pub. No.: WO94/09280

PCT Pub. Date: Apr. 28, 1994

[30] Foreign Application Priority Data

Oct. 8, 1992 [CH] Switzerland ............... 3148/92

[51] Int. Cl.$^6$ ............................................. F16B 12/14
[52] U.S. Cl. ............................ 403/408.1; 403/406.1; 411/409; 411/919; 81/124.2; 81/176.2
[58] Field of Search ................. 403/405.1, 406.1, 403/407.1, 408.1; 411/409, 402, 919, 400; 81/124.2, 176.1, 176.15, 176.2

[56] References Cited

U.S. PATENT DOCUMENTS

| | | | |
|---|---|---|---|
| 797,820 | 8/1905 | Peck | 464/106 X |
| 899,913 | 9/1908 | Shaw | 464/153 |
| 920,787 | 5/1909 | Sullivan | 403/405.1 |
| 1,311,679 | 7/1919 | Chalifoux | 464/106 |
| 1,732,354 | 10/1929 | Cooper | 464/153 |
| 1,838,310 | 12/1931 | Hubbel | 464/15 |
| 1,892,217 | 12/1932 | Moineau | 74/458 |
| 2,354,184 | 7/1944 | Daniel | 464/106 |
| 3,260,069 | 7/1966 | Neilson et al. | 464/16 |
| 3,405,540 | 10/1968 | Johnson | 464/106 X |
| 3,612,734 | 10/1971 | Dawson et al. | 418/48 |
| 3,855,754 | 12/1974 | Scoville et al. | 403/406.1 X |
| 4,025,140 | 5/1977 | Matys | 411/919 X |
| 4,029,368 | 6/1977 | Tschirky et al. | |
| 4,034,574 | 7/1977 | Kuder | 464/106 |
| 4,098,561 | 7/1978 | Tschirky et al. | 418/48 |
| 4,140,444 | 2/1979 | Allen | 418/48 |
| 4,157,022 | 6/1979 | Crase | |
| 4,220,380 | 9/1980 | Crase et al. | |
| 4,261,665 | 4/1981 | Hsiung | |
| 4,299,296 | 11/1981 | Geczy | 175/65 |
| 4,592,427 | 6/1986 | Morgan | 166/369 |
| 4,599,056 | 7/1986 | Crase | 418/48 |
| 4,636,151 | 1/1987 | Eppink | 418/48 |
| 4,641,988 | 2/1987 | Ganner | 403/407.1 X |
| 4,667,751 | 5/1987 | Geczy et al. | 175/61 |
| 4,679,638 | 7/1987 | Eppink | 175/107 |

(List continued on next page.)

FOREIGN PATENT DOCUMENTS

| | | | |
|---|---|---|---|
| 359602 | 3/1990 | European Pat. Off. | 403/406.1 |
| 1217700 | 5/1960 | France | 411/409 |
| 1280787 | 11/1964 | France | |
| 1387641 | 12/1964 | France | 81/176.1 |
| 1491842 | 7/1967 | France | |
| 2191638 | 2/1974 | France | |
| 663625 | 7/1938 | Germany | 464/153 |
| 104579 | 3/1917 | United Kingdom | 403/408.1 |
| 2084697 | 4/1982 | United Kingdom | |
| 2152588 | 8/1985 | United Kingdom | |

*Primary Examiner*—Anthony Knight
*Attorney, Agent, or Firm*—Wigman, Cohen, Leitner & Myers

[57] ABSTRACT

A metallic structural element for connecting workpieces consisting of wood, woodworking material or plastic, consisting of a lamellar part, which provides the non-positive connection with the first workpiece provided with a groove and a transverse hole, and a bolt-like part which, through screwing or pinning, realizes the non-positive connection with the second workpiece provided with a longitudinal hole. The lamellar part has, in the center, a hole which is at right angles to the plane of the lamella and is intended for fixing in the groove of the workpiece. Variants having a wing-like long or rectangular short lamellar part and a bolt-like part in the form of a conical wood screw, cylindrical screw, screw having a metal thread, threaded sleeve or pin. Accessories: screwing tool and drilling template.

15 Claims, 2 Drawing Sheets

U.S. PATENT DOCUMENTS

| | | | |
|---|---|---|---|
| 4,968,287 | 11/1990 | Jacob | 464/145 |
| 5,007,880 | 4/1991 | Walker | 464/159 |
| 5,048,622 | 9/1991 | Ide | 175/107 |
| 5,073,145 | 12/1991 | Ratzokwski et al. | 464/157 |
| 5,139,400 | 8/1992 | Ide | 418/48 |
| 5,251,996 | 10/1993 | Hiller et al. | 403/406.1 |
| 5,288,271 | 2/1994 | Nelson et al. | 464/147 X |

METALLIC STRUCTURAL ELEMENT FOR CONNECTING WORKPIECES CONSISTING OF WOOD, WOODWORKING MATERIAL OR PLASTIC

FIELD OF THE INVENTION

The invention relates to the further development and supplementation and completion of the connecting techniques and of the connecting elements used here.

The invention relates in particular to a metallic structural element for connecting workpieces consisting of wood, woodworking material, such as particle board, laminated board or plastic, based on the groove-and-tongue principle.

PRIOR ART

Structural elements based on a large number of connecting techniques for the assembly of several workpieces are known in interior decorating and in joinery, especially furniture making. In general, the object is to join more or less flat surfaces of adjacent individual parts to form a whole. Such connections may be detachable or nondetachable. The latter include in particular glued joints. Most frequently, the basic forms are flat surfaces abutting one another or meeting one another at right angles.

A known type of connection is based on the groove-and-tongue principle. The workpieces to be joined are each provided with a continuous groove or individual separated narrow slots into which an intermediate piece, the so-called "tongue" is inserted. In principle, this is known as keying from mechanical engineering. In order to produce a good non-positive connection, it is as a rule necessary to glue the tongue to the workpieces to be connected, in the groove. Another type of connection consists of the so-called clamping iron, a flat lug which is provided with holes and becomes a threaded bolt, generally in the form of a wood screw, at one end. Another type is the so-called Ringers' bracket, a U-shaped cylindrical metal rod which is used generally as a shelf support (e.g. bookshelves).

The known connecting elements are very unsatisfactory. The classical groove-and-tongue connection is as a rule not particularly suitable for the transmission of relatively large forces. Furthermore, it is very seldom detachable without damaging some part involved. The clamping iron is unattractive and must be inlet, countersunk and if necessary covered, thus involving additional work. The Ringers' bracket can be used only in specific cases and is not universally applicable.

There is therefore a great need for further development of connecting elements for, as far as possible, universal use in interior design, joinery, the household and the leisure and hobby sector.

The following documents are cited in connection with the prior art:
Brochure on clamping irons (cramp irons)
Brochure on connecting panels "Lamellae"
Brochure on Haas connection fitments
Brochure on Ringers' bracket
Brochure on shelf brackets

SUMMARY OF THE INVENTION

It is the object of the invention to provide a metallic structural element for connecting workpieces consisting of wood, woodworking material or plastic, based on the groove-and-tongue principle, which ensures a satisfactory non-positive connection of a plurality of workpieces without danger of tearing or breaking off. The connection should include the possibility of detachment at any time without any damage to the workpieces. The connecting element should be simple and convenient to use and to handle, without requiring expensive special additional tools. The structural element should be suitable for economical mass production and should be as universally applicable as possible.

This object is achieved if the metallic structural element mentioned at the outset consists of a flat lamellar part providing the non-positive connection with the first workpiece provided with a groove or a slot and a transverse hole and a bolt-like part which, through screwing or pinning, provides the non-positive connection with the second workpiece provided with a longitudinal hole and which rests on the lamellar part with its end face at right angles and is firmly connected to the said second workpiece, and if the lamellar part has, at its center, along the axis of the bolt-like part, a hole which is perpendicular to the plane of the lamella and is intended for fixing the first workpiece by means of a screw or of a pin.

BRIEF DESCRIPTION OF THE DRAWINGS

The invention is described with reference to the following embodiments illustrated in detail by the figures.

DETAILED DESCRIPTION

Figure 1:
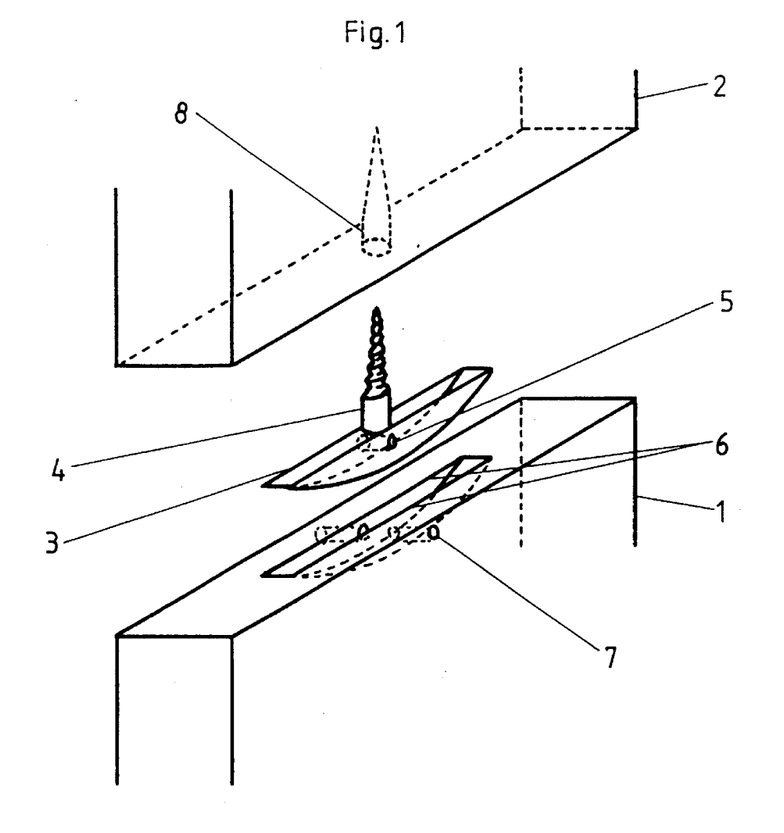
FIG. 1 shows a schematic exploded perspective view illustrating in principle the composition of the structural element and its arrangement in relation to the workpieces to be connected.

FIG. 1 shows a schematic exploded perspective view illustrating in principle the composition of the structural element and its arrangement in relation to the workpieces to be connected. 1 is a first workpiece comprising a vertical wooden board finely worked at least on its end face or a corresponding particle board. 2 represents a second workpiece of the same material, likewise vertical. The workpieces 1 and 2 are to be detachably connected to one another by a butt joint. For this purpose, the first workpiece 1 is provided with an arc-like groove 6 parallel to the longitudinal edge and arranged approximately in the center and with a transverse hole 7 passing through this groove 6.

The workpiece 2 has in its central part, in the plane of the transverse hole 7, a longitudinal hole 8 for receiving the structural element. The latter is produced from a metallic material and consists in principle of the lamellar part 3 to be lowered into the groove 6 and of the bolt-like part 4 which produces the firm connection with the second workpiece 2 via the longitudinal hole 8. This bolt-like part 4 thus constitutes the non-positive connection with the second workpiece 2 via a screw connection or pinning. Instead of being connected flush with the first workpiece 1 by a butt joint, said workpiece 2 can of course also be connected at right angles to a lateral surface or at any angle.

Figure 2:
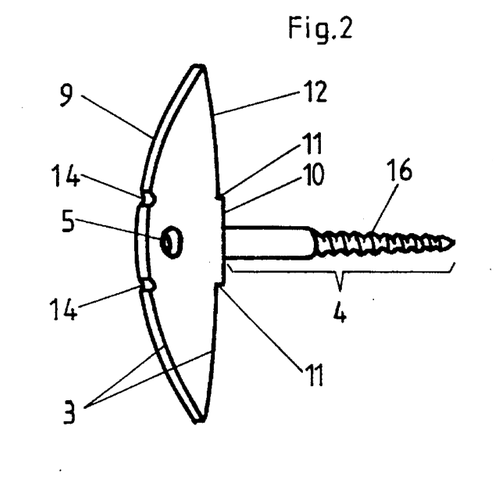
FIG. 2 shows a perspective view of the basic embodiment of the structural element having a lamellar part and a bolt-like part in the form of a wood screw.

FIG. 2 relates to a perspective view of the basic embodiment of the structural element having a lamellar part and a bolt-like part in the form of a wood screw. Relative to FIG. 1, the structural element is shown rotated through 90° with regard to the plane of the lamella and rotated through 90° about its main axis. The lamellar part 3 consists of a flat tab-like wing having an arc shape 9 at its outer contour and is provided with a taper 12 toward the ends of the wing. At its inner contour, the lamellar part 3 has a flat stop 10, adjacent to which is a step 11. The hole 5 whose axis is perpendicular to the plane of the lamella is present in the plane of symmetry of the structural element, which plane is defined by the axis of the bolt-like part 4. The outer contour (arc 9) of the lamellar part 3 has two notches 14 for receiving the beads 15 of the screwing tool (cf. FIG. 8). These notches 14 prevent lateral slipping of the screwing tool during fixing of the structural element in the second workpiece 2. Here, the bolt-like part 4 is in the form of a wood screw 16 having a conical thread.

Figure 3:
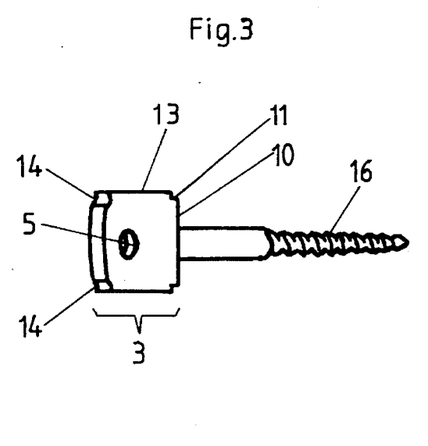
FIG. 3 shows a perspective view of a special embodiment of the structural element for compact use in corners of the workpieces.

FIG. 3 shows a perspective view of a special embodiment of the structural element for compact use in corners of the workpieces. This is essentially the basic embodiment according to FIG. 2 but with cut-off wings of the lamellar part 3. The latter once again has the stop 10, the steps 11, the hole 5 and the notches 14. Apart from the arc-shaped outer contour, the lamellar part 3 is essentially a rectangle 13. In the present case, the bolt-like part 4 is once again a wood screw 16.

Figure 4:
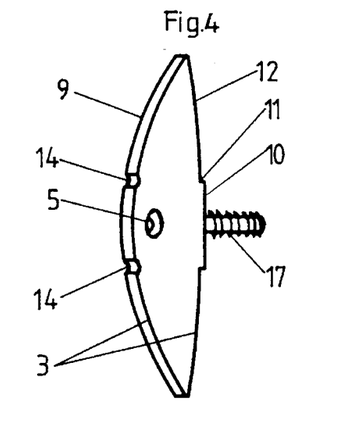
FIG. 4 shows a perspective view of an embodiment of the structural element having a bolt-like part in the form of a screw having a cylindrical thread.

FIG. 4 shows a perspective view of an embodiment of the structural part having a bolt-like part in the form of a screw with a cylindrical thread. The lamellar part 3 is exactly the same as in FIG. 2. The reference symbols 3, 5, 9, 10, 11, 12 and 14 correspond exactly to those in FIG. 2. Here, the bolt-like part 4 consists of a screw 17 having a short cylindrical thread which is suitable for screwing into an appropriate predrilled hole in wood, particle boards, plastic, dowel plugs, etc.

Figure 5:
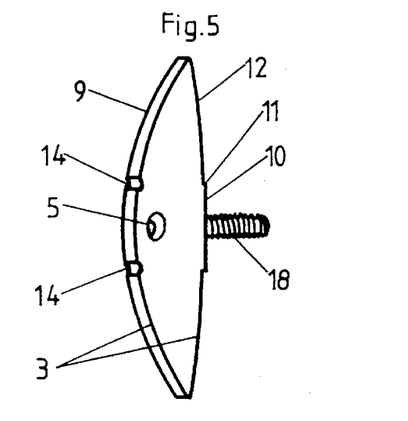
FIG. 5 shows a perspective view of an embodiment of the structural element having a bolt-like part in the form of a screw having a cylindrical metal thread.

FIG. 5 relates to a perspective view of an embodiment of the structural element having a bolt-like part in the form of a screw with a cylindrical metal thread. The lamellar part 3 is exactly the same as in FIG. 2. The reference symbols 3, 5, 9, 10, 11, 12 and 14 correspond exactly to those in FIG. 2. Here, the bolt-like part 4 consists of a screw 18 having a comparatively short cylindrical metal thread which is suitable for screwing into an appropriate internal thread in a metal or plastic sleeve or in another member provided with an internal thread or in a dowel plug.

Figure 6:
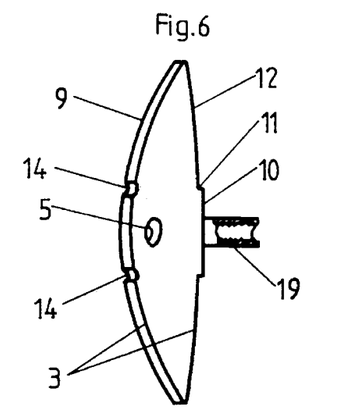
FIG. 6 shows a perspective view of an embodiment of the structural element having a bolt-like part in the form of a threaded sleeve.

FIG. 6 relates to a perspective view of an embodiment of the structural element having a bolt-like part in the form of a threaded sleeve. The lamellar part 3 is exactly the same as in FIG. 2. The reference symbols 3, 5, 9, 10, 11, 12 and 14 correspond exactly to those in FIG. 2. Here, the bolt-like part 4 consists of a threaded sleeve 19 (metallic internal thread) which is suitable for screwing onto an appropriate metallic external thread on a threaded bolt let into the second workpiece 2.

Figure 7:
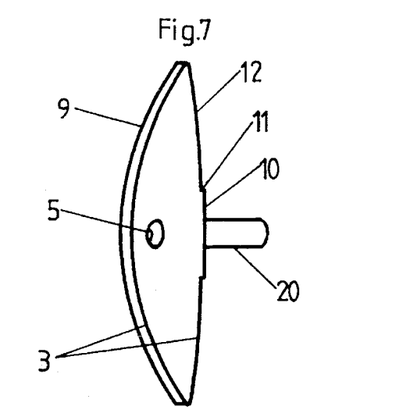
FIG. 7 shows a perspective view of an embodiment of the structural element having a bolt-like part in the form of a pin.

FIG. 7 shows a perspective view of an embodiment of the structural element having a bolt-like part in the form of a pin. The lamellar part 3 is exactly the same as in FIG. 2. The reference symbols 3, 5, 9, 10, 11, 12 and 14 correspond exactly to those in FIG. 2. Here, the bolt-like part 4 consists of a pin 20 or a smooth tube for insertion into an appropriate smooth hole in the second workpiece 2 (plug connection).

Figure 8:
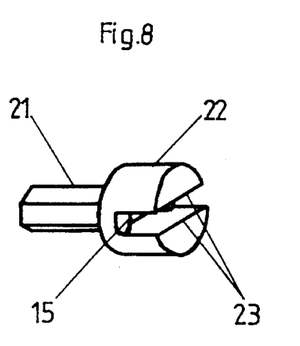
FIG. 8 shows a perspective view of a screwing tool and FIG. 9 shows a perspective view of a drilling template.

FIG. 8 shows a perspective view of a screwing tool. This screwing tool serves for fixing the structural element according to the embodiment in the FIGS. 2, 3, 4, 5 and 6 in the second workpiece 2 by screwing in. The screwing tool is suitable for insertion or clamping in a rotating mechanical hand tool (for example a drill). It consists of a shaft 21 for clamping in the hand tool, in the present case in the form of a hexagon, a head 22 having a transverse groove 23 for receiving the lamellar part 3 of the structural element to be screwed in and two beads 15 at the bottom of the transverse groove 23, which engage the notches 14 of the lamellar part 3. The beads 15 prevent the screwing tool from slipping off sideways from the structural part during the screwing process. The shaft 21 can of course also have a different cross-section, for example it may be any polygon or a circle.

Figure 9:
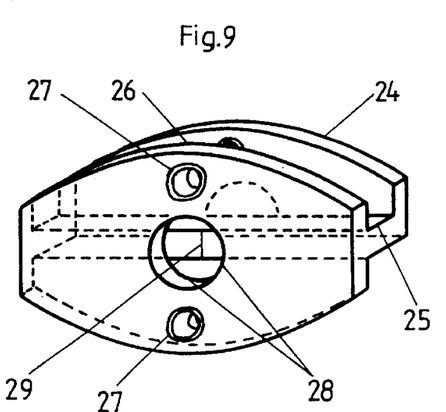

FIG. 9 shows a perspective view of a drilling template. This drilling template serves for guiding the drill during production of the transverse hole 7 in the first workpiece 1. For this purpose, it is placed flush in the groove 6 cut out beforehand. The drilling template consists of a plate-like arc-shaped template 24 for placing in the groove 6, the stop part 25 which is to be placed against the end face of the first workpiece 1, and the counter-plate 26. At least the latter has the drill bush 27. In the present case, the arc-shaped template 24 also has a drill bush in order to permit drilling of the first workpiece 1 in one operation. A cut-out 28 through which the center mark 29 (perpendicular line with arrow) is visible is provided for better monitoring.

Embodiment 1

See FIGS. 1 and 2

The structural element is according to FIG. 2 and consists of low-carbon steel which permits a high degree of cold working during production. The lamellar part 3 is punched and the bolt-like part 4 is cold-worked from wire rod. Parts 3 and 4 are butt-welded and the raw finished part is burred, cleaned, machined and then pickled. The surface of the structural element is chromium-plated for protection against corrosion and oxidation.

The dimensions are:
lamellar part 3: W=57 mm; H=12 mm; D=4 mm
bolt-like part 4: L=40 mm; D=5 mm The workpieces 1 and 2 to be joined consist of oak wood with an end face of 22 mm×150 mm. The connection is a butt joint at the end faces, according to FIG. 1. The groove 6 in the workpiece 1 is produced by means of a circular saw of 100 mm diameter and is cut 13 mm deep and 4 mm wide. The transverse hole 7 in the workpiece 1 is drilled through from the stop side in the middle of the end face and has a diameter of 5 mm. A steel screw having a length of 18 mm and a diameter of 5 mm is present in the transverse hole 7 for securing. The longitudinal hole 8, which has a length of 40 mm and a diameter of 3 mm, is present in the workpiece 2, perpendicular to the end face (predrilled for receiving the bolt-like part 4).

The structural element is screwed into the workpiece 2 by means of the screwing tool (cf. FIG. 8) with a 4.5 mm wide transverse groove 23. For this purpose, the screwing tool is clamped in a drill. The transverse hole 7 in the workpiece 1 is drilled with the aid of the drilling template (cf. FIG. 9). The radius of the arc-shaped template 24 is 50 mm and the internal diameter of the drill bush 27 is 5.2 mm. The stop part 25 has an internal diameter of 9 mm.

The total time required for joining the workpieces 1 and 2 is about 6 minutes.

Embodiment 2

See FIG. 2

The structural element produced according to Example 1 and having the same dimensions corresponds to FIG. 2. In contrast to FIG. 1, the present case relates to the fixing (detachable connection) of a shelf to a perpendicular wooden wall (angular joint). The shelf corresponds to the workpiece 1 and the wall to the workpiece 2. The workpieces are machined analogously to Example 1. First, the longitudinal hole 8 is predrilled horizontally into the perpendicular wall (workpiece 2) and the wood screw 16 (bolt-like part) of the structural element is screwed into the wall. The groove 6 is cut into the longitudinal side of the shelf to be positioned horizontally (workpiece 1), and the transverse hole 7 is drilled in said shelf. The shelf is then pushed onto the lamellar part 3 of the structural element and secured with a screw in transverse hole 7.

The nondetachable fixing of a wooden shelf to a perpendicular wall should be mentioned here as a variant of this Example. Said wall is provided with a number of dowel plugs, in which the holes 8 are predrilled. The structural element used is one having roughened ("structured") lateral surfaces of the lamellar part 3. Before the shelf is inserted/pushed on, glue is applied in the corresponding grooves 6.

Another possibility here is the detachable fixing of a shelf in a recess, the end faces of the shelf being provided with continuous grooves 6 for insertion via the lamellar parts 3.

The detachable or nondetachable connection of perpendicular walls of any kind which meet one another at right angles is a further variant of this Example (angular joint).

Embodiment 3

See FIG. 3

The structural element is according to FIG. 3 and consists of low-carbon steel which has a high degree of cold-workability. The blank consists of wire rod which has been hot-upset, pressed flat and then cold-worked. The raw finished part is burred, cleaned, machined and chromium-plated to increase the corrosion resistance and stability to oxidation.

The dimensions are:

lamellar part 3 (rectangle 13): W=17 mm; H=15 mm; D=4 mm bolt-like part 4 (wood screw 16): L=40 mm;

The workpieces 1 and 2 to be joined consist of walnut wood, the workpiece 2 representing a corner in the adjacent perpendicular walls of a piece of furniture and workpiece 1 representing a detachable shelf (double angular joint). The procedure is similar to Examples 1 and 2. The walls forming the corner are each provided with a longitudinal hole 8 for receiving the bolt-like part 4 (wood screw 16) of the structural element. The screwing tool is used for screwing in. A groove 6 is cut and a transverse hole 7 is drilled in the end face and in the longitudinal side of the shelf. The shelf is pushed onto the lamellar parts 3 of the structural elements and secured with screws.

The structural element according to FIG. 3 is used wherever there is no space for a broad, wing-like lamellar part 3 according to FIG. 2 and furthermore where there is no possibility or necessity for producing a groove 6 for the workpiece 1: corners, feet, consoles, bases, etc. of furniture at the wall or floor.

Embodiment 4

See FIG. 4

The structural element is according to FIG. 4 and consists of low-carbon steel. The blank is punched from a strip, hot-worked and pressed at room temperature (screw 17 having a cylindrical thread as bolt-like part). The raw finished part is machined and galvanized.

The dimensions are:

lamellar part 3: W=60 mm; H=13 mm; D=4 mm bolt-like part 4 (17): L=12 mm; D=4.5 mm In the present case, the workpiece 1 corresponds to the intermediate floor and the workpiece 2 corresponds to the side wall of a cupboard. The former has a groove 6 for receiving the lamellar part 3 and the latter has a number of cylindrical holes for receiving the bolt-like part 4 in the form of a screw 17 having a cylindrical thread. Otherwise, the procedure is similar to Example 1. The connection is secured via the transverse hole 7 in the intermediate floor by means of a pin and can be detached at any time.

Connections between cupboard floor and cupboard side are produced in principle in the same way.

The nondetachable connection between a vertical intermediate wall (workpiece 1 having a continuous groove 6 in the upper end face and one in the lower end face) and a cupboard floor or cupboard top (workpiece 2 having cylindrical longitudinal holes 8) may be mentioned here as a variant of this Example. The intermediate wall is inserted horizontally over the lamellar parts 3 provided with "structure". Gluing is effected analogously to the variant in Example 2.

Embodiment 5

See FIG. 5

The structural element is according to FIG. 5 and has in principle the same dimensions as in FIG. 4. The screw 18 having a cylindrical metal thread is precision machined. Otherwise, the material and production correspond to the data stated under Example 4.

Similarly to Example 4, the connection here relates to the detachable connection of a cupboard floor to a cupboard side, especially in the form of a corner joint. The cupboard side is predrilled for the insertion of threaded dowel plugs having a cylindrical internal thread. The structural elements are then screwed, by means of their screw 18 having a cylindrical metal thread (bolt-like part 4), into the dowel plugs of the cupboard side (workpiece 2). The cupboard floor (workpiece 1) is provided in its end faces with grooves 6 for receiving the lamellar part 3 and with transverse holes 7 for securing by means of screws/pins. The cupboard floor is then pushed onto the lamellar parts 3 of the structural elements in a conventional manner and secured laterally via the transverse holes 7.

A similar procedure is adopted in the case of multi-part cupboards assembled in a row. Instead of using dowel plugs in the cupboard sides, through holes are drilled and threaded sleeves having an internal thread are pressed in. These receive a structural element with a screw 18 as a bolt-like part 4 coaxially from each side.

Embodiment 6

See FIG. 6

The structural element having the form according to FIG. 6 consists of low-carbon steel and is produced similarly to Example 1. The lamellar part 3 is punched and the bolt-like part 4, in the form of a threaded sleeve 19, is produced from a section of a tube having an internal thread, and the end face is butt-welded to the lamellar part 3. The raw finished part is burred, cleaned, machined, pickled and chromium-plated. The dimensions correspond approximately to those in Example 4. Here, the threaded sleeve 19 has an external diameter of about 5.5 mm, and the internal thread corresponds to M 4.

As in Example 5, the connection here relates to the detachable fixing of a cupboard floor to a cupboard side. The cupboard side (workpiece 2) is provided with through holes having the external diameter of the threaded sleeves 19 and the latter are inserted into the relevant hole and secured from the opposite side with a screw bolt. The cupboard floor (workpiece 1) is provided with grooves 6 and with transverse holes 7 according to Example 5 and is pushed onto the lamellar parts 3 and secured.

A similar procedure is adopted in the case of multi-part cupboards. Inserted into the through holes in the cupboard side are threaded bolts which receive, on both sides, the threaded sleeves 19 of the opposite structural elements, onto whose lamellar parts 3 are pushed the cupboard floors lying in the same plane.

Embodiment 7

See FIGS. 5 and 6

This relates to the combined use of structural elements with a screw 18 having a cylindrical metal thread (FIG. 5) and structural elements having a threaded sleeve 19 (FIG. 6) of the same thread diameter, said structural elements forming a pair. The material, design, dimensions and production of the structural elements correspond to Examples 5 and 6.

In the case of the detachable connection, the procedure adopted is similar to that in Example 6 for the fixing of a plurality of floors to a cupboard side. Holes having the size of the external diameter of the cylindrical threaded sleeve 19 are drilled in the cupboard side (workpiece 2), and said threaded sleeve is inserted and the bolt-like part of the opposite structural element, which part is in the form of a screw 18, is screwed in and secured. All other procedures correspond to those of Examples 5 and 6.

Embodiment 8

See FIG. 7

The structural element formed according to FIG. 7 consists of chromium-plated low-carbon steel and is produced similarly to Example 1. The lamellar part 3 is punched and the bolt-like part 4, in this case in the form of pin 20, is produced from a section of a cylindrical rod and is butt-welded at the end face to the lamellar part 3. Deburring, cleaning, machining, pickling and chromium-plating correspond to the procedure in the preceding Examples. The dimensions of the structural element correspond approximately to those of Example 4. Here, the pin 20 has a diameter of about 5 mm.

The present case relates to the arrangement of a shelf in a cupboard recess and securing to prevent falling out. Vertical rows of holes are present at the same height in the side wall of the cupboard. The pin 20 of the bolt-like part of the particular structural element is inserted into the hole provided in such a way that the lamellar part 3 comes to rest with its surface horizontal. The shelf is simply placed on the lamellar parts 3 and if necessary secured by means of screws or pins via the holes 5 and the transverse holes 7 to prevent it from falling out.

Arrangements of shelves (workpiece 1) having arc-shaped recesses in the lower surface of the shelf (parallel to the horizontal plane of the shelf) or having arc-shaped grooves 6 are considered to be variants of this Example. Consequently, the shelves are retained in their position in a better and more stable manner and also contribute to the rigidity of the total piece of furniture.

The handling of the screwing tool according to FIG. 8 for mounting the structural element in workpiece 2 and of the drilling template according to FIG. 9 for producing the transverse hole 7 in the workpiece 1 is familiar to any person skilled in the art and requires no additional explanation.

The invention is not limited to the embodiments.

The metallic structural element for connecting workpieces 1 and 2 consisting of wood, woodworking material, such as particle board, laminated board or plastic, based on the groove-and-tongue principle, consists of a flat lamellar part 3, which provides the non-positive connection to the first workpiece 1 provided with a groove 6 or a slot and a transverse hole 7, and a bolt-like part 4 which, through screwing or pinning, provides the non-positive connection to the second workpiece 2 provided with a longitudinal hole 8 and which rests with its end face at right angles on the lamellar part 3 and is firmly connected to the said second workpiece 2, the lamellar part 3 having, in its center, along the axis of the bolt-part 4, a hole 5 which is at right angles to the plane of the lamella and intended for fixing the first workpiece 1 by means of a screw or of a pin. The lamellar part 3 preferably has an arc shape 9 at its outer end face and possesses, at its end face adjacent to the bolt, a projecting flat stop 10 with a recessed step 11 and, toward both tapering ends in the direction of the plane of the lamella, a recessed taper 12 in order to ensure greater convenience for screwing or insertion into the second workpiece. In a special embodiment, the lamellar part 3 has an arc shape 9 at its outer end face and also has a rectangular shape 13 so that the transverse dimension exceeds the dimension of the stop 10 by not more than 20%.

The structural element advantageously has grooves 14 in the outer end face of the lamellar part 3, which grooves are intended for receiving a mechanical screwing tool which is provided with corresponding beads 15 in order to prevent lateral slipping during the screwing process.

The bolt-like part 4 consists of a wood screw 16 having a conical thread for screwing into wood, particle boards or soft plastic or dowel plugs, or of a screw 17 having a cylindrical thread for screwing into cylindrical holes in wood, particle boards or plastic, or of a screw 18 having a cylindrical metal thread for screwing into a threaded sleeve, threaded dowel or nut, or of a threaded sleeve 19 provided with an internal thread for screwing onto a screw, threaded bolt or threaded rod, or of a pin 20 or of a smooth tube.

In its particular embodiment, the lamellar part 3 has lateral surfaces which, in order to improve the adhesion when glued to the workpiece 1, are roughened, possess indentations or protuberances or a structured pattern or are otherwise treated to increase the surface area.

The screwing tool for the structural element consists of a cylindrical or polygonal shaft 21 and a head 22 having a transverse groove 23 with a circular bottom and lateral beads 15.

The drilling template for the structural element consists of a member having a U-shaped cross-section, with a plate-like arc-shaped template 24 corresponding to the groove shape of the first workpiece 1, a stop part 25 for depth adjustment and a counter-plate 26 for receiving the drill bush 27 and a cut-out 28 for monitoring and a center mark 29.

Advantages of the Invention

The connection between the workpieces is detachable at any time by removing the metallic structural element.

If a nondetachable firm connection of the workpieces is desired, this is possible without changing the design and the procedure, by gluing the lamellar part to the grooved workpiece.

Suitability for mass production of the structural element.

Universal applicability of the structural element for all types of joining and assembling of any number of workpieces.

No special additional tools required. A groove cutter and drill are sufficient for preparing the workpieces to be connected.

Little time required for connecting the workpieces. The method is therefore suitable for mass production in joinery.

Mechanically very strong connection with high load-bearing capacity and with minimum danger of cracking or of breaking of the material of the workpieces close to the connection.

I claim:

1. A metallic structural element for connecting a first workpiece provided with a groove and a transverse hole to a second workpiece provided with a longitudinal hole, said element comprising:

a substantially flat lamellar part which provides a connection with said first workpiece; and a bolt-like part which, when inserted into the longitudinal hole in said second workpiece, provides a connection with the second workpiece;

wherein said lamellar part has, at a center portion thereof, along an axis of said bolt-like part, a hole which is perpendicular to a plane of said lamellar part and to the axis of said bolt-like part, said hole being adapted to receive a fastener inserted through the transverse hole of said first workpiece for fixing said lamellar part to said first workpiece.

2. The element as recited in claim 1, wherein said bolt-like part comprises a wood screw having a conical thread for screwing into any one of wood-particle board, soft plastic and dowel plugs.

3. The element as recited in claim 1, wherein said bolt-like part comprises a screw having a cylindrical thread for screwing into cylindrical holes in any one of wood, particle boards, and plastic.

4. The element as recited in claim 1, wherein said bolt-like part comprises a screw having a cylindrical metal thread for screwing into any one of a threaded sleeve, a threaded dowel plug, and a nut.

5. The element as recited in claim 1, wherein said bolt-like part comprises a threaded sleeve provided with an internal thread for receiving any one of a screw, a threaded bolt and a threaded rod.

6. The element as recited in claim 1, wherein said bolt-like part comprises any one pin and a smooth tube.

7. The element as recited in claim 1, wherein said lamellar part has lateral surfaces which are roughened in order to improve adhesion when fixed to said first workpiece.

8. The element as recited in claim 1, wherein said lamellar part has lateral surfaces which are provided with any one of indentations, protrubrances and a structured pattern so as to improve adhesion when fixed to said first workpiece.

9. The element as recited in claim 1, in combination with a drilling template comprising a member having a U-shaped cross-section and a plate-like, arc-shaped member corresponding to a shape of the groove of said first workpiece, said template further comprising a stop portion for adjustment and a counter-plate for receiving a drill bush.

10. A metallic structural element for connecting a first workpiece provided with a groove and a transverse hole to a second workpiece provided with a longitudinal hole, said element comprising:

a substantially flat lamellar part which provides a connection with said first workpiece; and a bolt-like part which, when inserted into the longitudinal hole in said second workpiece, provides a connection with the second workpiece;

wherein said lamellar part has, at a center portion thereof, along an axis of said bolt-like part, a hole which is perpendicular to a plane of said lamellar part and to the axis of said bolt-like part, said hole being adapted to receive a fastener inserted through the transverse hole of said first workpiece for fixing said lamellar part to said first workpiece;

wherein said lamellar part has an outer end face which is arc-shaped and an inner end face adjacent to said bolt-like part, said inner end face comprising a stop disposed immediately adjacent to said bolt-like part, a step located adjacent to an outer edge of said stop, and a tapered portion located at an outer edge of said step remote from said stop.

11. A metallic structural element for connecting a first workpiece provided with a groove and a transverse hole to a second workpiece provided with a longitudinal hole, said element comprising:

a substantially flat lamellar part which provides a connection with said first workpiece; and a bolt-like part which, when inserted into the longitudinal hole in said second workpiece, provides a connection with the second workpiece;

wherein said lamellar part has, at a center portion thereof, along an axis of said bolt-like part, a hole which is perpendicular to a plane of said lamellar part and to the axis of said bolt-like part, said hole being adapted to receive a fastener inserted through the transverse hole of said first workpiece for fixing said lamellar part to said first workpiece;

wherein said lamellar part comprises an outer end face which is arc-shaped and an inner end face immediately adjacent to said bolt-like part, said inner end face comprising a stop immediately adjacent to said bolt-like part and a step located at an outer edge of said stop remote from said bolt-like part, said lamellar part having a side extending in a plane parallel to the axis of said bolt-like part, said side being rectangular in shape.

12. A metallic structural element for connecting a first workpiece provided with a groove and a transverse hole to a second workpiece provided with a longitudinal hole, said element comprising:

a substantially flat lamellar part which provides a connection with said first workpiece; and a bolt-like part which, when inserted into the longitudinal hole in said second workpiece, provides a connection with the second workpiece;

wherein said lamellar part has, at a center portion thereof, along an axis of said bolt-like part, a hole which is perpendicular to a plane of said lamellar part and to the axis of said bolt-like part, said hole being adapted to receive a fastener inserted through the transverse hole of said first workpiece for fixing said lamellar part to said first workpiece;

wherein said lamellar part has an outer end face remote from said bolt-like part, said outer end face being provided with notches adapted to the engaged by a mechanical screwing tool in order to prevent lateral slipping of said element during a screwing process.

13. A screwing tool for a metallic structural element for connecting a first workpiece provided with a groove and a transverse hole to a second workpiece provided with a longitudinal hole, said element comprising:

a substantially flat lamellar part which provides a connection with said first workpiece; and a bolt-like part which, when inserted into the longitudinal hole in said second workpiece, provides a connection with the second workpiece;

wherein said lamellar part has, at a center portion thereof, along an axis of said bolt-like part, a hole which is perpendicular to a plane of said lamellar part and to the axis of said bolt-like part, said hole being adapted to receive a fastener inserted through the transverse hole of said first workpiece for fixing said lamellar part to said first workpiece;

wherein said screwing tool comprises a shaft and a head connected to said shaft, said head having a transverse groove with a circular bottom and lateral beads.

14. The tool as recited in claim 13, wherein said shaft comprises a cylindrical shaft.

15. The tool as recited in claim 13, wherein said shaft comprises a polygonal shaft.

* * * * *

UNITED STATES PATENT AND TRADEMARK OFFICE
CERTIFICATE OF CORRECTION

PATENT NO. : 5,529,428
DATED : June 25, 1996
INVENTOR(S) : Bischof

It is certified that error appears in the above-indentified patent and that said Letters Patent is hereby corrected as shown below:

Column 7, line 14, "(a metric fine thread)" should appear after "M4"

Claim 6, column 9, line 62, "of a" should appear before "pin"

Claim 12, column 11, line 10, "the" should be "be"

Claim 13, column 11, line 13, "A screwing tool for" should read "In combination a screwing tool and"

Claim 13, column 12, line 10, "and" should appear after ";"

Claim 13, column 12, line 11, "wherein" should be deleted

Signed and Sealed this

Fourth Day of February, 199

Attest:

BRUCE LEHMAN

*Attesting Officer*   *Commissioner of Patents and Trademarks*